US012057264B2

(12) United States Patent
Poddar

(10) Patent No.: US 12,057,264 B2
(45) Date of Patent: Aug. 6, 2024

(54) FORMING INTEGRATED INDUCTORS AND TRANSFORMERS WITH EMBEDDED MAGNETIC CORES

(71) Applicant: Texas Instruments Incorporated, Dallas, TX (US)

(72) Inventor: Anindya Poddar, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1554 days.

(21) Appl. No.: 15/787,451

(22) Filed: Oct. 18, 2017

(65) Prior Publication Data

US 2018/0040420 A1 Feb. 8, 2018

Related U.S. Application Data

(63) Continuation of application No. 14/549,746, filed on Nov. 21, 2014, now abandoned.

(60) Provisional application No. 61/907,515, filed on Nov. 22, 2013.

(51) Int. Cl.
*H01F 41/04* (2006.01)

(52) U.S. Cl.
CPC ...... *H01F 41/046* (2013.01); *Y10T 29/49073* (2015.01)

(58) Field of Classification Search
CPC ......................... H01F 41/046; Y10T 29/49073
See application file for complete search history.

(56) References Cited

U.S. PATENT DOCUMENTS 4,673,904 A * 6/1987 Landis ................ H01L 23/5384 29/829
5,321,380 A 6/1994 Godek et al.
7,563,640 B2 7/2009 Wakisaka et al.
2003/0070282 A1* 4/2003 Hiatt ....................... H01F 41/34 336/213
2003/0112555 A1 6/2003 Sato et al.
2007/0075819 A1* 4/2007 Okuzawa ............ H01F 17/0033 336/200
2009/0188104 A1* 7/2009 Ching ................... H01F 41/046 29/602.1
2012/0209365 A1* 8/2012 Seifert ..................... A61N 1/05 29/601
2013/0056847 A1* 3/2013 Chen ....................... H01F 27/29 257/E29.325

* cited by examiner

*Primary Examiner* — Su C Kim
(74) *Attorney, Agent, or Firm* — Yudong Kim; Frank D. Cimino

(57) ABSTRACT

In accordance with an embodiment of the application a method of forming an integrated magnetic device is described. A prepreg or core is mounted on a carrier. A winding layer is plated and patterned on the prepreg or core. Vias are plated. The silicon is placed on a die attach pad, ensuring sufficient clearance of die to vias and d/a char. The assembly is laminated and grinded to expose the vias. A $2^{nd}$ layer of vias is provided by sputtering or plating followed by laminating assembly; and grinding assembly to expose vias. The windings are plated and patterned. A solder mask (SMSK) is applied and assembly finished.

13 Claims, 5 Drawing Sheets

FORMING INTEGRATED INDUCTORS AND TRANSFORMERS WITH EMBEDDED MAGNETIC CORES

CROSS-REFERENCE TO RELATED APPLICATIONS

This application is a continuation of application Ser. No. 14/549,746, filed on Nov. 21, 2014, which claims the benefit of priority under 35 U.S.C. § 119(e) of U.S. Provisional Application 61/907,515 filed on Nov. 22, 2013. Said applications are incorporated herein by reference.

FIELD

This invention relates to the field of integrated circuit packaging and, more specifically, integrated inductors and transformers with embedded magnetic cores.

BACKGROUND

Switched power supplies—either as point of load or as DSP cores are moving to multi phase architectures in order to continuously improve form factor without sacrificing efficiency (from increased switching loss). This drives the need for high performance coupled inductors that can be integrated close to the IC with minimal stray parasitic.

Such integration (arrays of coupled integrated inductors and transformers) cannot be addressed with discrete inductors. Wafer level integration offers a path for performance but at a very high cost, making it non-competitive.

A method is desired to provide Small form factor, high performance and scalable (coupled arrays, transformers, multiphase), low cost.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

In accordance with an embodiment of the application a method of forming an integrated magnetic device is described. A prepreg or core is mounted on a carrier. A winding layer is plated and patterned on the prepreg or core. Vias are plated. The silicon is placed on a die attach pad, ensuring sufficient clearance of die to vias and d/a char. The assembly is laminated and grinded to expose the vias. A 2nd layer of vias is provided by sputtering or plating followed by laminating assembly; and grinding assembly to expose vias. The windings are plated and patterned. A solder Mask (SMSK) is applied and assembly finished.

In accordance with another embodiment of the present application a method of forming an integrated magnetic device package is described. A copper CU sheet is planarized using chemical mechanical planarizing (CMP) or plasma thinning. An insulating layer is applied to the top surface of the Cu sheet. Magnetic layers are sputtered on the top surface of the insulating layer. The magnetic layers are patterned and etched. Vias are provided and plated. The vias may include bar vias used as stiffeners outside of the package body. The magnetic material is annealed in a magnetic field. The assemblies are laminated (prepreg or film). The assemblies are grinded to expose vias. The windings are plated and patterned. The top windings are laminated. The CU sheet is stripped from the assembly. The bottom windings are applied and patterned. A solder mask SMSK is applied and assembly finished.

DESCRIPTION OF THE VIEWS OF THE DRAWING

In the drawings, like reference numerals are sometimes used to designate like structural elements. It should also be appreciated that the depictions in the figures are diagrammatic and not to scale.

DETAILED DESCRIPTION OF EXAMPLE EMBODIMENTS

Figure 1:
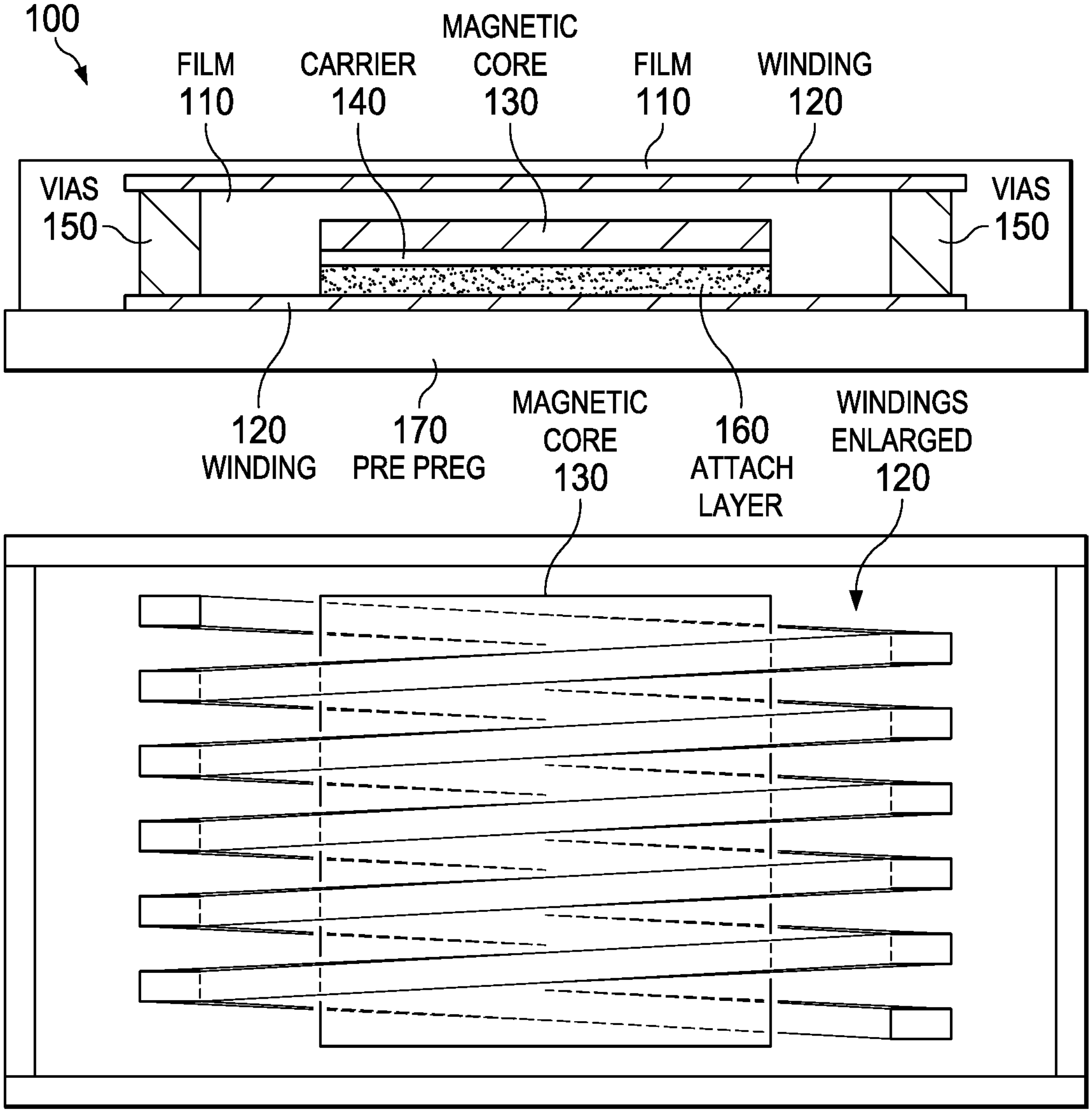
FIG. 1 is illustrative of package devices with inductors or transformers with embedded magnetic cores.

The embodiments of the invention are described with reference to the attached figures. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The embodiments of the invention are not limited by the illustrated ordering of acts or events, as some acts may occur in different orders and/or concurrently with other acts or events. Furthermore, not all illustrated acts or events are required to implement a methodology in accordance with the present invention.

Discrete inductors may not suitable for applications with multiphase switching where arrays of coupled inductors may be needed.

Development with sputtered cores, thick CU windings and SU8 polymers for high aspect ratio vias have been investigated. While performance and size have been demonstrated, the costs of a wafer level integrated inductor are 1.4×-4× more than discretes, making the technology non-competitive.

Embodiments of the invention aim at leveraging the key performance benefits from a high performance core (either sputtered or plated) and the ability of laminate substrates to have thick CU (for low DC resistance).

While there are several approaches to creating inductors with laminates, they are all large and typically have low performance due to eddy currents and incomplete magnetic paths (typically a race track inductor layout).

The embodiments describe a solenoid like approach with windings around a high performance magnetic core. Typical embedding technologies are constrained by the thickness of the embedded IC and drilled (mechanical or laser) via technologies, which require a large via pitch and consequently a larger inductor with increased resistance. The embodiments approach use plated vias and panel level grinding to enable embedding cores that are less than 10 um thick, with very dense via pitch (comparable to a wafer level fabrication approach commonly used in applications with higher current densities that need thick CU and tight inductor coil windings).

Use of a high performance core, planar structure which use CU traces (windings) around a magnetic core allows for a complete magnetic flux capture vs racetrack structures or air core structures, wherein 'tall' via formations using plated vias and panel level grinding enables tight 'windings', small size and low DRC.

Embedded advanced core with windings on laminate have challenges. Wafers with cores are high stressed and may warp during back grind BG. Thinnest BG may be 50 um using Taiko equipment. Typical embedded applications may only handle die at 100 um. Vias that connect top and bottom layer routing should be taller than the embedded core (magnetic material+Si), and this typically results in coarse windings. Typical drilled vias used for embedded applications tend to have 250 um via pitch in HVM and 175 um pitch in Proto stage, which do not meet the needs for tight windings needed for magnetics. The present embodiments provide an approach to embedding and leveraging built up vias, LDI and panel level chemical mechanical polishing CMP/plasma thinning that allows creation of tight windings.

FIG. 1 Is illustrative of package devices with inductors or transformers with embedded magnetic cores. The package 100 includes a substrate 170, attach layer 160, magnetic core 130 on carrier 140. Windings 120 surround the magnetic core 130. Vias 150 provide connection path through film 110.

Figure 2A:
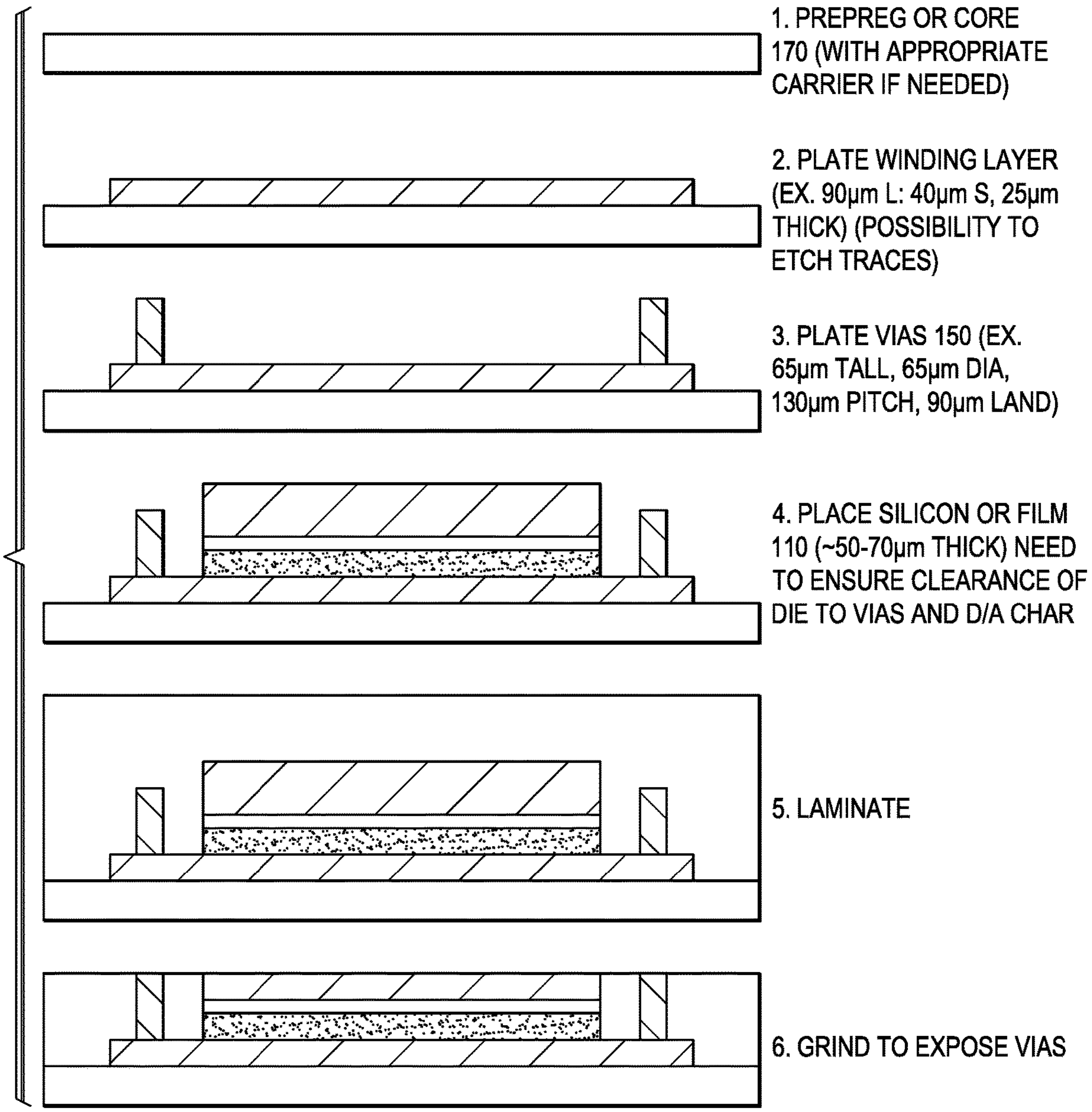
FIG. 2 (comprising FIGS. 2A and 2B) is illustrative of a method in accordance with a first embodiment.
Figure 2B:
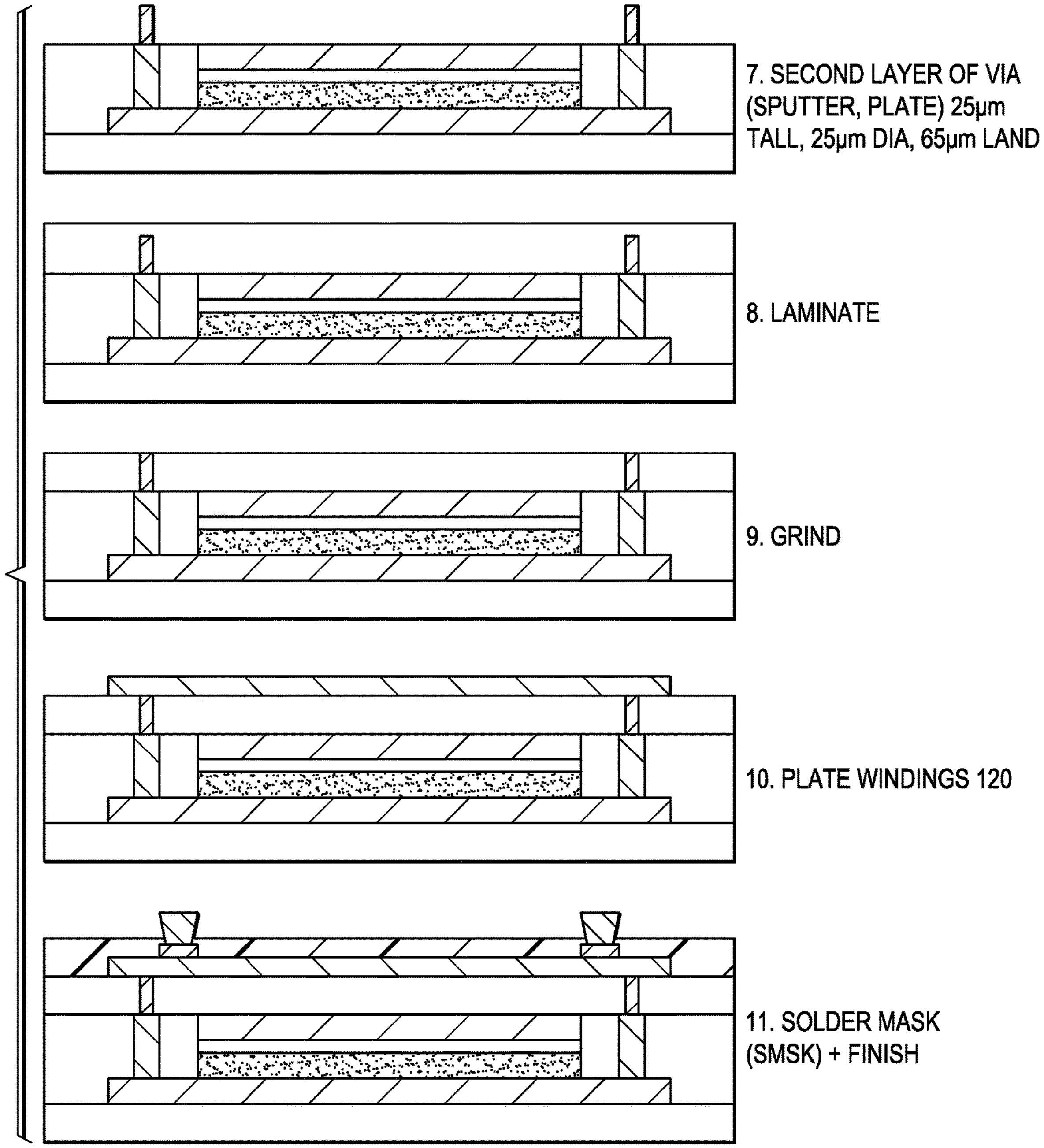

FIG. 2 (comprising FIGS. 2A and 2B) is illustrative of a method in accordance with a first embodiment:

Step 1 of FIG. 2A, prepreg or core (with appropriate carrier if needed).

Step 2 of FIG. 2A, plating and patterning a winding layer (example winding may be 90 um L: 40 um S, 25 um thick). Traces may be etched.

Step 3 of FIG. 2A, plate vias (example: vias may be 65 um tall, <65 um dia, <130 um pitch).

Step 4 of FIG. 2A, place silicon (as example, may be 50-70 um thick) on die attach pad. Ensure sufficient clearance of die to vias and d/a char.

Step 5 of FIG. 2A, laminate assembly.

Step 6 of FIG. 2A, grind assembly to expose vias.

Step 7 of FIG. 2B, provide 2nd layer of via (can sputter or plate), (an example: 2nd layer may be 25 um tall, 25 um diameter).

Step 8 of FIG. 2B, laminate assembly.

Step 9 of FIG. 2B, grind assembly to expose vias.

Step 10 of FIG. 2B, plate and pattern windings.

Step 11. of FIG. 2B, solder mask SMSK and finish assembly.

Figure 3A:
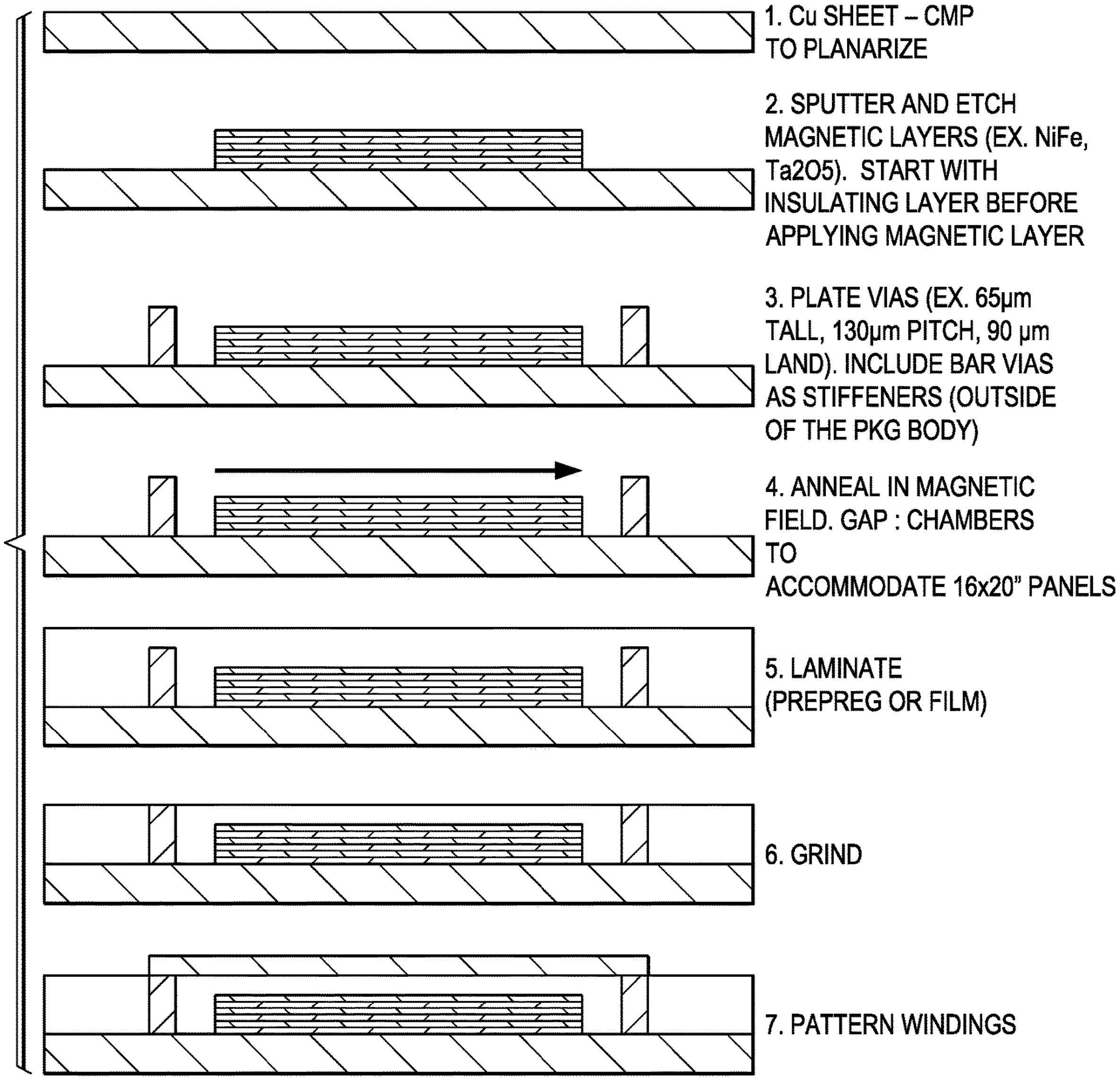
FIG. 3, (comprising FIGS. 3A and 3B), is illustrative of another method to create a panel based sputtered core in accordance with another embodiment.
Figure 3B:
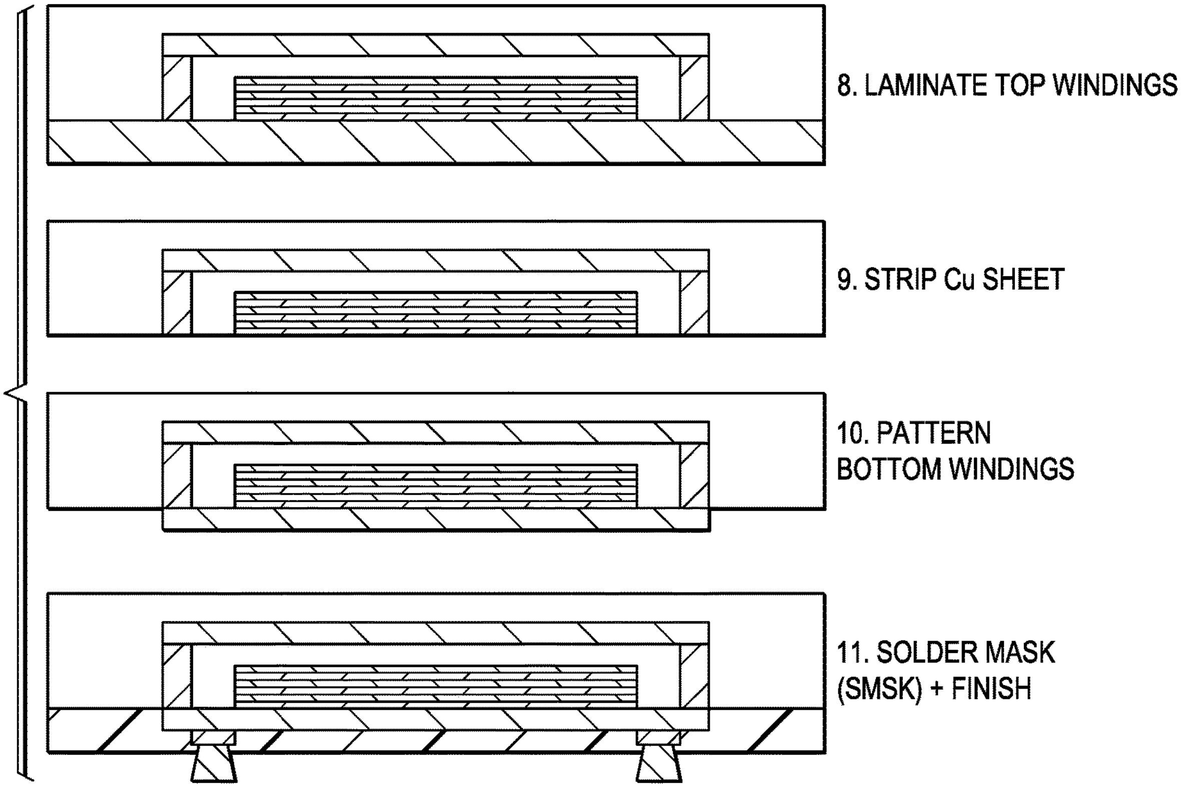

FIG. 3, (comprising FIGS. 3A and 3B), is illustrative of another method to create a panel based sputtered core in accordance with another embodiment.

Step 1 of FIG. 3A, provide and planarize a copper Cu sheet using chemical mechanical planarizing CMP.

Step 2 of FIG. 3A, apply an insulating layer to the top surface of the Cu sheet and then sputter magnetic layers (magnetic layers can be NiFe or Ta2O5) on the top surface insulating layer. Pattern and etch magnetic layers.

Step 3 of FIG. 3A, plate vias (for an example: vias may be 65 um tall, <130 um pitch). Embodiment may include bar vias as stiffeners outside of the package body.

Step 4 of FIG. 3A, anneal magnetic material in a magnetic field. Anneal chambers may accommodate 16×20 inch panels.

Step 5 of FIG. 3A, laminate (prepreg or film).

Step 6 of FIG. 3A, grind assembly to expose vias.

Step 7 of FIG. 3A, plate and pattern windings.

Step 8 of FIG. 3A, laminate top windings.

Step 9 of FIG. 3A, strip CU sheet from assembly.

Step 10 of FIG. 3A, apply and pattern bottom windings.

Step 11 of FIG. 3A, solder mask SMSK and finish assembly.

The present embodiments provide Small form factor, high performance and scalable (coupled arrays, transformers, multiphase), at low cost.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A semiconductor package comprising:

a substrate;

a first winding layer on the substrate;

an attach layer on the first winding layer;

a carrier on the attach layer;

a magnetic core on the carrier, wherein the magnetic core is disposed over the first winding layer with the carrier and the attach layer between the first winding layer and the magnetic core;

a first via physically contacting the first winding layer;

a first film covering portions of the first via, the magnetic core, the first winding layer, and the substrate;

a second via on the first via, wherein a first footprint of the first via is greater than a second footprint of the second via, and wherein the first footprint surrounds the second footprint;

a second film covering portions of the second via and the magnetic core; and a second winding layer on the second film and connected to the second via.

2. The semiconductor package of claim 1, further comprising a solder mask layer covering portions of the second winding layer and the second film, wherein the solder mask layer is different than the first and second films configured for a laminate process.

3. The semiconductor package of claim 2, further comprising an electrical connector coupled to the second winding layer, wherein the electrical connector includes a first portion contacting the second winding layer and a second portion connected to the first portion, the second portion extending through a top surface of the solder mask layer.

4. The semiconductor package of claim 1, wherein the first and second winding layers are plated winding layers.

5. The semiconductor package of claim 1, wherein the first via has a height of about 65 micro meters, and a diameter of about 65 micro meters.

6. The semiconductor package of claim 1, wherein the first via is oriented perpendicular to a first plane along a length of the first film, and a second plane along a length of the second film.

7. The semiconductor package of claim 6, wherein the second via is oriented perpendicular to the first plane along the length of the first film, and the second plane along the length of the second film.

8. The semiconductor package of claim 1, wherein the first via is laterally spaced apart from the magnetic core.

9. The semiconductor package of claim 1, wherein each of the first and second winding layers has a thickness of about 25 micro meters.

10. The semiconductor package of claim 1, wherein the first and second winding layers are plated layers.

11. The semiconductor package of claim 1, wherein the first via is a plated via.

12. The semiconductor package of claim 1, wherein the second via is one of a plated via and a sputtered via.

13. The semiconductor package of claim 1, wherein a magnetic material of the magnetic core is annealed in a magnetic field.

* * * * *